Jan. 1, 1935. J. D. RUST Re. 19,411

COTTON GATHERING MACHINE

Original Filed Jan. 27, 1928 5 Sheets-Sheet 1

Inventor
John D. Rust
By Albert T. Dieterich
Attorney

Jan. 1, 1935. J. D. RUST Re. 19,411

COTTON GATHERING MACHINE

Original Filed Jan. 27, 1928 5 Sheets-Sheet 2

Inventor
John D. Rust
By Albert E. Dieterich
Attorney

Jan. 1, 1935. J. D. RUST Re. 19,411

COTTON GATHERING MACHINE

Original Filed Jan. 27, 1928 5 Sheets-Sheet 3

Inventor
John D. Rust
By Albert E. Dieterich
Attorney

Jan. 1, 1935. J. D. RUST Re. 19,411

COTTON GATHERING MACHINE

Original Filed Jan. 27, 1928 5 Sheets-Sheet 4

Inventor

John D. Rust

By Albert E. Dieterich

Attorney

Jan. 1, 1935. J. D. RUST Re. 19,411

COTTON GATHERING MACHINE

Original Filed Jan. 27, 1928 5 Sheets-Sheet 5

Inventor

John D. Rust

By Albert E. Dieterich

Attorney

Reissued Jan. 1, 1935

Re. 19,411

UNITED STATES PATENT OFFICE 19,411

COTTON GATHERING MACHINE

John Daniel Rust, Memphis, Tenn.

Original No. 1,910,307, dated May 23, 1933, Serial No. 249,943, January 27, 1928. Application for reissue June 7, 1934, Serial No. 729,452

37 Claims. (Cl. 56—43)

The present invention relates to cotton picking machines and objects of the invention are to improve and render more efficient machines of this character and to provide a novel organization whereby the above objects may be attained.

A further and important object is to provide a cotton picking machine having smooth surfaced spindles and simple and effective means for applying moisture to said spindles.

It is well known that during the last eighty years or so much time and money has been spent in efforts to construct a satisfactory cotton picking machine using the serrated type of spindle; but certain inherent difficulties have been encountered with the serrated type of spindles which make them unsuitable for practical use. They are expensive, heavy, inclined to damage the cotton plant and gather a great deal of leaf trash and the like, will gum up with leaf sap and dirt, the teeth get dull, and removing the cotton from such spindles has proved to be difficult and uncertain.

The smooth surfaced spindles, when properly applied, avoid the foregoing difficulties.

The principle of applying moisture to revolving smooth surfaced spindles to cause cotton to adhere thereto has been known for centuries, as observed in the use of the old spinning wheel. I propose to utilize this principle in a new type of cotton picking machine.

I am aware that others have attempted the use of smooth surfaced spindles, but insofar as I know they have been tried only in drum type machines. The diameters of the drums are necessarily comparatively small being limited by excessive weight or the width of the cotton row. This tends to prevent the spindles from remaining in the plants long enough to pick the cotton thoroughly. Furthermore, because of the short radius of the drum, the spindles of this type machine have a tendency to pull off green bolls and mangle the plants when entering and leaving them.

Another important object, therefore, is to provide a machine with an endless spindle carrying belt having an outwardly curved track on the picking side of the machine which will cause the spindles to enter and leave the plants gradually, said belt being timed with respect to the row so as to move the spindles backward while in the cotton row at approximately the same speed that the machine is being moved forward. This arrangement has the effect of a large spindle carrying drum acting on the row but in reality is more nearly in the nature of a segment of a large drum thus enabling the machine to be constructed narrow enough to pass between the rows of cotton plants and at the same time allowing the spindles to remain a comparatively long time in the plants for efficiently gathering the cotton therefrom without injury to the plants or green bolls.

A further object is to provide in combination with this endless spindle carrying belt a tunnel-like structure through which the cotton plants pass and into which the spindles are projected, one side of said tunnel serving to restrain the cotton plants from following the spindles around toward the stripping side of the machine.

A further object is to provide inner retaining means serving to prevent the spindles from moving inwardly from their proper position, and eliminating the necessity for having individual devices on the spindles for preventing inward movement.

A further object of the invention is to provide a machine having its picking mechanism operated from one side of the row of cotton.

Further objects are to provide traveling rotatable spindles and simple and effective mechanism whereby the said spindles may be rotated for picking the cotton from the plants, and simple and effective means for stripping the cotton from the spindles and delivering same to conveying means for carrying the cotton to the proper container.

Still further objects are to guide the cotton stalks into the picking mechanism where the open bolls of cotton can be effectively acted upon.

Other objects are to provide novel and effective means for arranging the spindles whereby they will come in contact with all of the open bolls of the cotton plants as the machine is passed over the row.

In spite of all previous efforts to construct a satisfactory cotton picking machine, none have up to now, insofar as I know, met with sufficient success to become an important factor in the harvesting of cotton. Most of these machines have been heavy, complicated, expensive and incapable of performing satisfactory work, and consequently of no value to the cotton grower. I wish it to be understood, therefore, that this invention is not a mere improvement on machines already in practical use, but my object is to devise a new type of cotton picking machine which will be simple and inexpensive and sufficiently fieldworthy to be adaptable for general use.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figures 4 and 5 are both fragmentary views and are on enlarged scales as compared with Figures 1, 2 and 3.

Figures 1, 8:
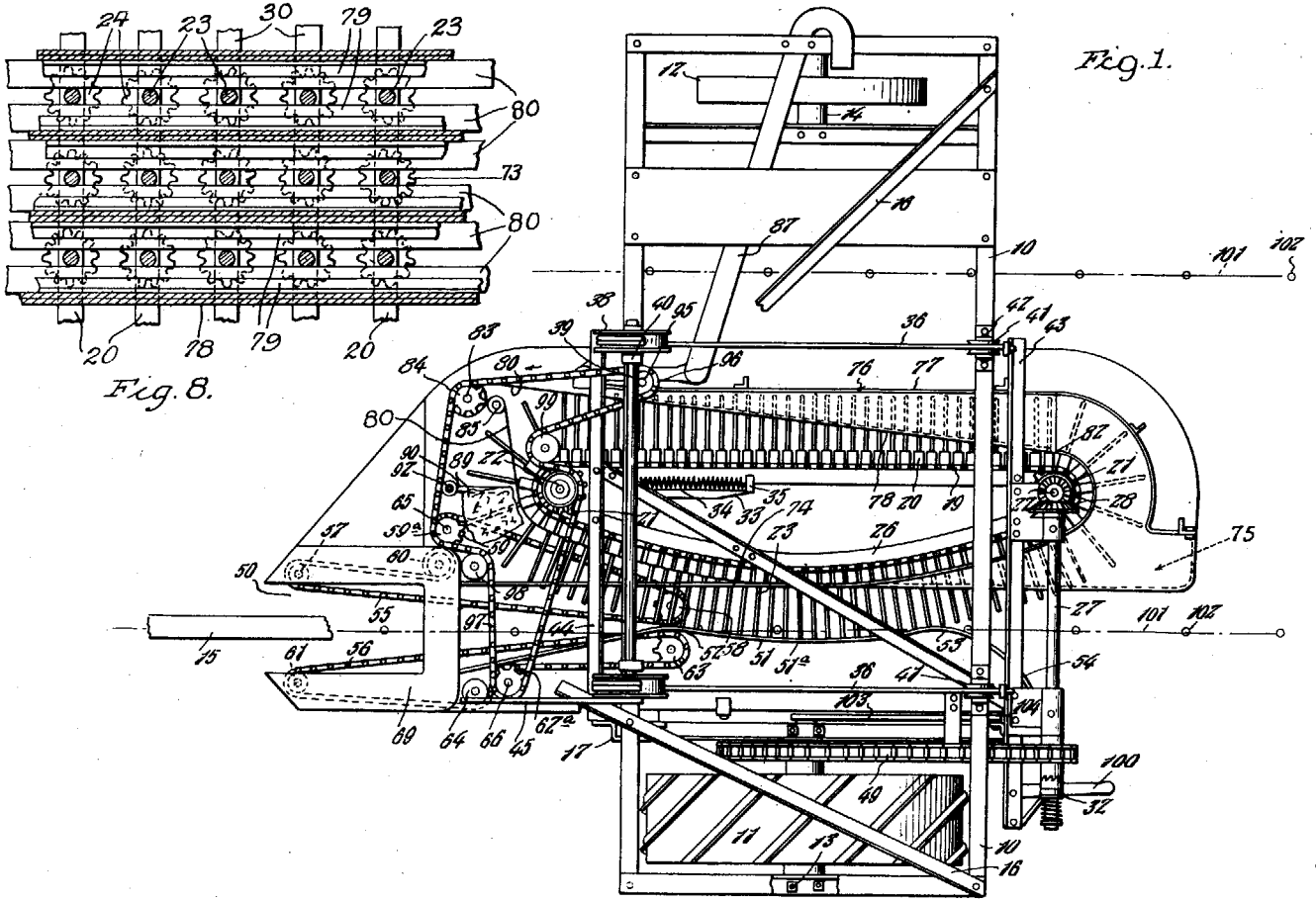
Figure 1 is a plan view of the machine with parts omitted for the sake of clearer illustration.
Figure 8 is a section on line 8—8 of Figure 4.
Figure 2:
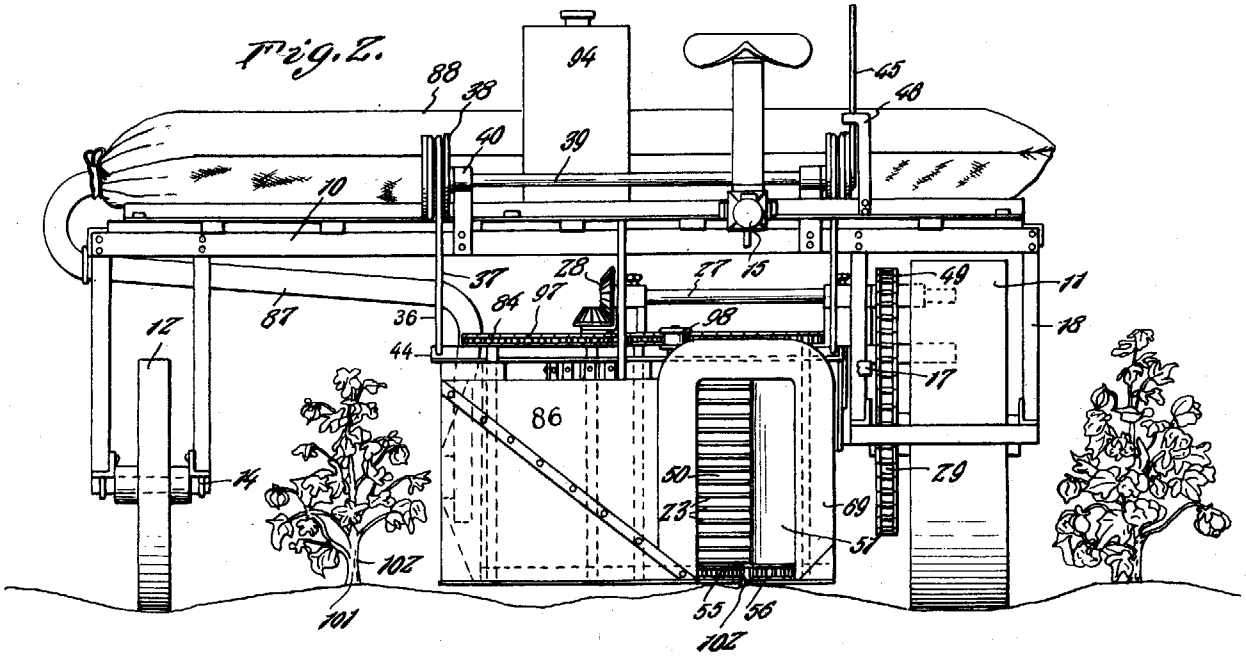
Figure 2 is a front elevation of the machine showing the same in relation to cotton rows.

The invention is based on the fact that a small rod when moistened and placed in contact with cotton and then rotated will wind the cotton about itself and the machine is constructed in accordance with the following specification and has been built to effectively utilize this fact. In order to construct a machine that may be effective for the above purpose and to carry out the objects set forth in the preceding paragraphs, I have constructed a machine comprising a carrying frame in the nature of a truck upon which is mounted a frame that may be adjusted up and down upon the carrying frame of the truck. This latter frame may be known as the picking frame or unit and carries thereon an endless belt having spindles projecting therefrom in a lateral direction with respect to the frame, the endless belt being rotatable and so arranged that the spindles in the rotation thereof will be brought in contact with a moistening device before entering the stalks for picking the cotton therefrom. The endless belt is supplemented by suitable guiding means for the cotton stalk and the frame carries also effective means for stripping the cotton from the spindle.

The forward end of the picking frame is provided with endless belts or chains which effectively guide the cotton stalks into picking contact with the picking spindles.

With this brief statement of the nature of the machine, I will now describe the same in detail, referring to the parts by reference numerals, the same numerals designating the same parts in all views of the drawings.

In the drawings, 10 designates the main frame of the carrying truck which is mounted upon a bull wheel 11 and a small wheel 12 suitably journaled thereto as at 13 and 14. A tongue 15 is provided which is connected to the main frame and suitable brace members 16 connect the main frame with the tongue. Suitable guide brackets 17 are provided on the main frame for guiding the supplemental frame or picking unit 18 in its vertical adjustment relative to the main frame.

Mounted upon the supplemental frame are roller chains 19 which are spaced apart vertically and lie respectively adjacent the upper and lower surfaces of the supplemental frame or picking unit. The roller chains have secured thereto vertically extending slats 20 preferably of wood and as my present embodiment is constructed, I have found maple to be the best material for this purpose. The roller chains are provided with sprocket links which receive therethrough the sprockets or sprocket wheels 21 respectively at the forward and rear end of the supplemental frame, the sprockets being mounted on shafts 22 extending vertically of the supplemental frame and suitably journaled therein for supporting the roller chains upon the supplemental frame.

Figure 4:
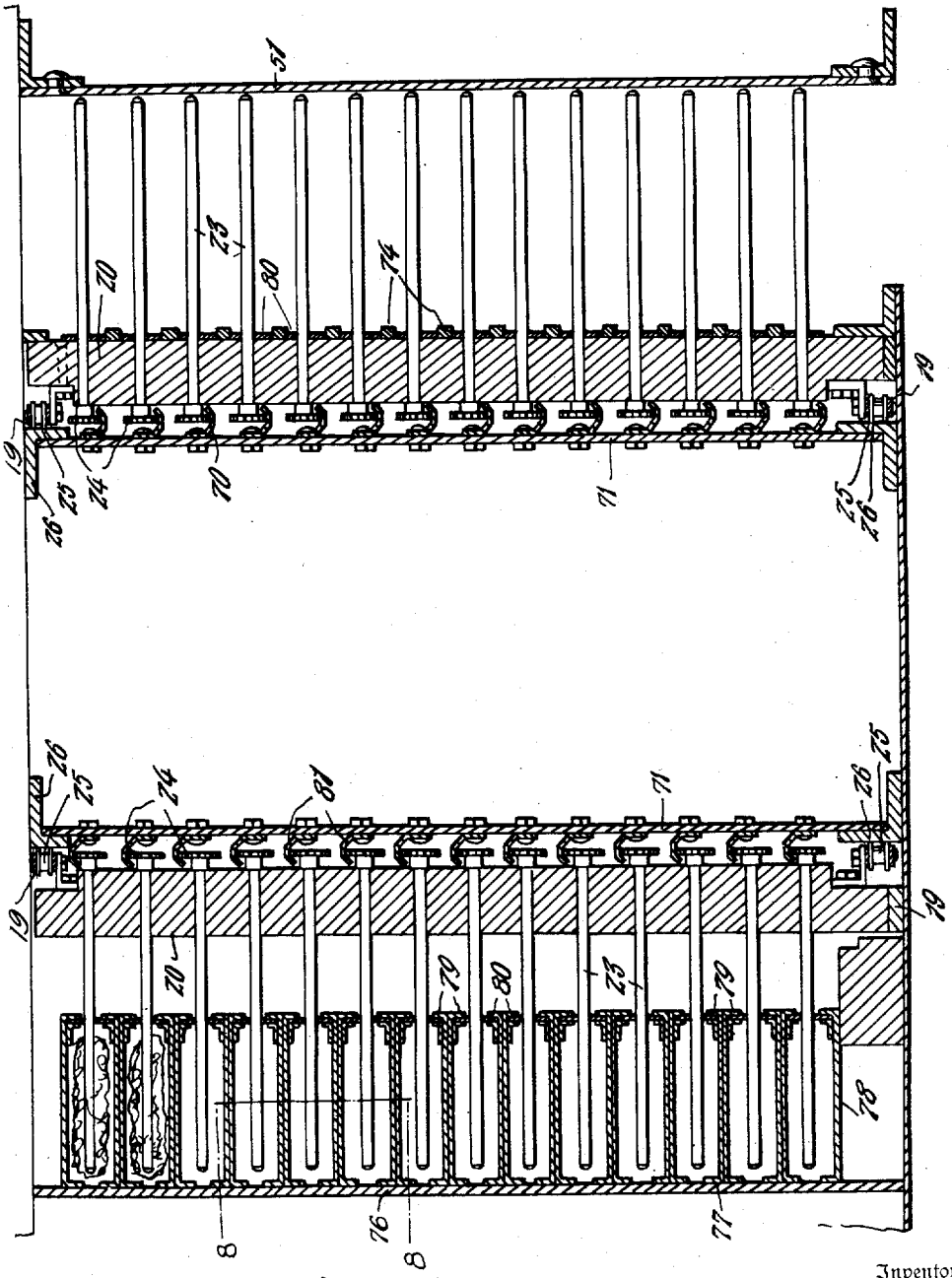
Figure 4 is a transverse sectional view through Figure 1 showing the means for rotating the picking spindles in the picking operation and means for rotating the same in the delivery of the cotton also showing the mechanism for stripping the cotton from the spindles.
Figure 6:
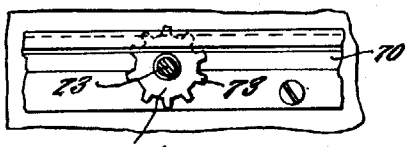
Figure 6 is a detail fragmentary view showing one of the spindles in co-acting relation with a rack for rotating the same.
Figure 7:
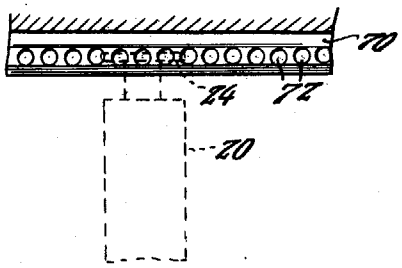
Figure 7 is a similar view showing the rack in plan and the spindle related thereto in dotted lines.
Figure 5:
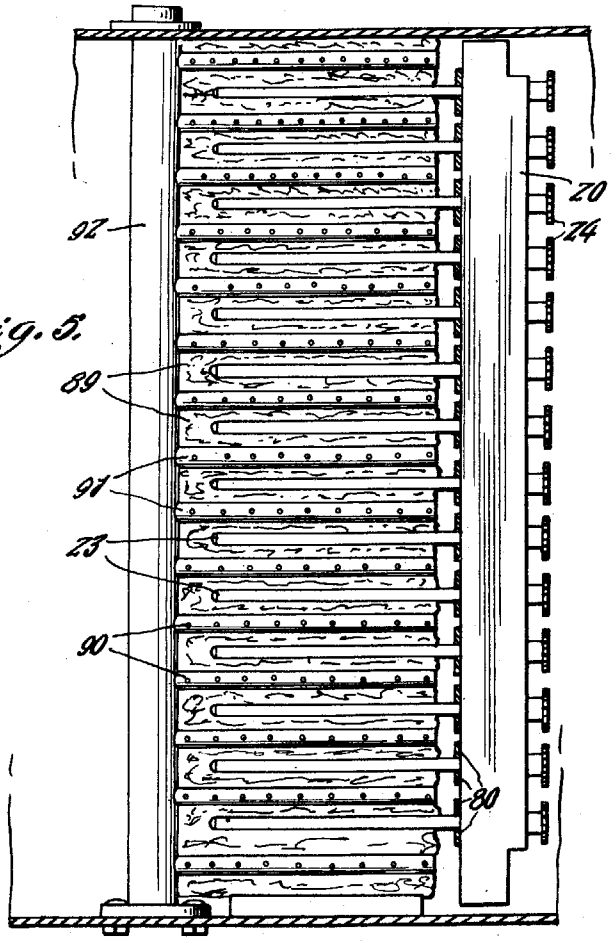
Figure 5 is a sectional view through the front part of Figure 1 showing the spindles in relation to the moistening apparatus.

Extending laterally with respect to the supplemental frame are a plurality of spindles 23, said spindles being journaled in the slats 20 as clearly shown in Figure 4, there being a plurality of spindles projecting from each slat arranged in spaced vertical rows thereon, one row to each slat, said spindles being provided at one end thereof with toothed wheels 24 for a purpose which will presently appear.

The rollers 25 on the roller chain 19 contact with suitable tracks 26 permanently mounted upon the supplemental frame, said tracks being slightly arched outward on the picking side but lying in a flat vertical plane on the delivery side of the machine as shown in Figure 1 of the drawings. The roller chains are driven in their revolution about the shafts 22 by means of a shaft 27 extending transversely of the supplemental frame and having miter gear connection with one of the shafts 22 as shown at 28, the shaft 27 being driven by the bull wheel 11 through sprocket wheels 29 and 30 respectively on the shaft 31 of the bull wheel and shaft 27 described above about which is trained the sprocket chain 49. The sprocket 30 is mounted for rotation relative to the shaft 27 and is effectively connected with the said shaft 27 for rotating the same through a clutch 32.

The roller chains are held taut upon the sprockets 21 by means of spring controlled sliding bars 33 in which the forward shaft 22 is journaled. The springs for the bars 33 are indicated by the reference numeral 34 and have their respective ends secured to the frame and lugs 35 which extend from the sliding bars 33 as suggested in Figure 1 of the drawings.

The supplemental frame as stated above is mounted for vertical adjustment relative to the main frame of the carrying truck in guideways 17, said supplemental frame being suspended from the main frame by means of cables 36 and 37 which are attached at one end to winding drums 38 mounted on a shaft 39 which is journaled transversely of the main frame as at 40.

Figure 3:
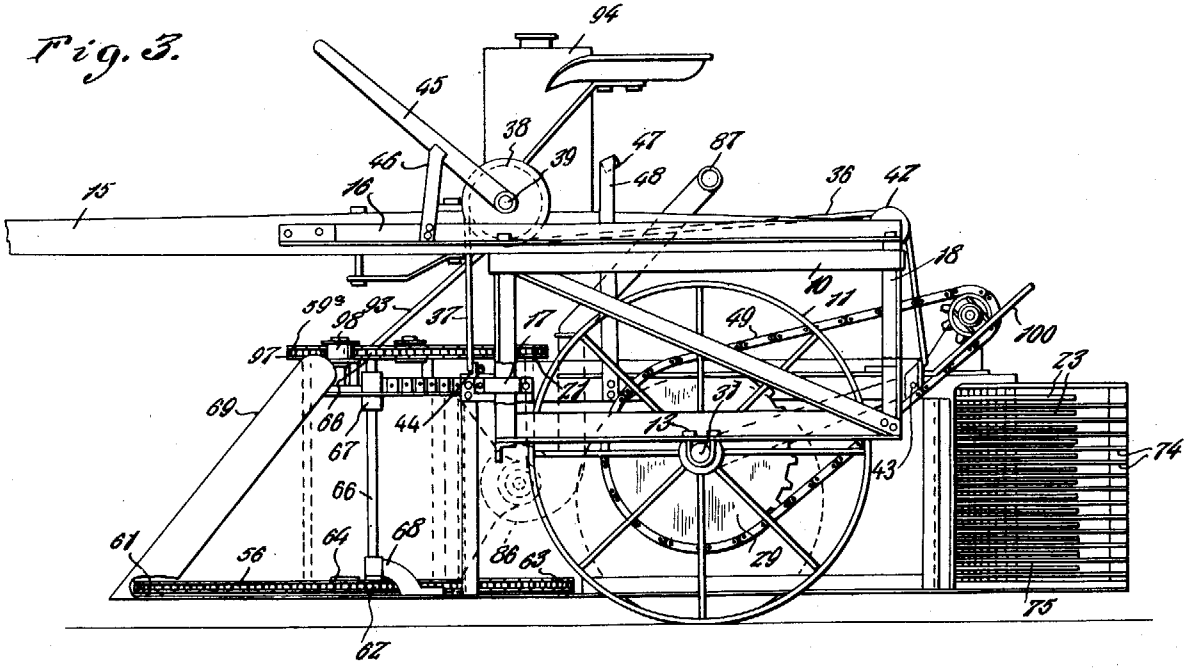
Figure 3 is a side elevation of the machine.

The cables 36 extend rearwardly from the main frame and are trained about pulleys 41 suitably journaled on the said main frame between brackets 42, the rearwardly extending ends of said cables being connected to a cross member 43 which as shown is an angle bar constituting a part of the supplemental frame. The cables 37 are similarly connected to a cross member 44 of similar shape arranged at the forward end of the supplemental frame. A lever 45 is provided on the shaft 39 and this lever may be moved to its forward position as shown in Figure 3 to rest upon a notched upright 46 secured to the main frame, or when the lever is moved to its rearward position it will be held supported by means of a downwardly extending lip 47 formed on an upright 48. It will be understood that when the lever is moved to this latter position the drums 38 will be rotated for raising the supplemental frame to an inoperative position. The machine is raised to this position when it is travelling from one field to another.

The forward end of the supplemental frame is provided with a cut away portion forming an opening 50 of considerable width into which the stalks of a row of cotton plants will pass in their progress toward a tunnel, the opening 50 constituting the mouth of this tunnel and it is defined by a sheet iron shield 51 which extends rearwardly from the mouth 50 and the spaced guard bars 74. The shield 51 provides one side of the tunnel while the guard bars form the other side thereof. These guard bars 74 extend the entire length of the frame, as shown in Figure 1, and have their rear ends bent and fastened to the rear part of the frame, as shown in dotted lines in Figure 1. The bars are spaced in a vertical plane so that the spindles will pass between them. These bars act to separate the cotton stalks from the spindles and prevent them from being carried around to the opposite side of the frame. The bars also act to prevent green bolls from being pulled from the plants. As will be seen from Figure 1, the outer ends of the spindles at the front end of the picking side pass between the bars and as the spindles are carried rearwardly, they will project a greater distance beyond the bars until the bars contact the slats, as shown in Figure 4, or practically so. Then the spindles gradually leave the bars as they move rearwardly toward the rear end of the device.

The sheet metal shield is extended rearwardly to a point where it is disposed in close proximity with the free ends of the spindles and is thence bowed laterally in an outward direction in a manner to conform to the shape of the adjacent portion of the tracks 26, and as shown at 51*a*, the picking space extending from a point as designated by the numeral 52 to a point 53 arranged rearwardly thereof at which point the shield is again bowed laterally in an outward direction as shown at 54. The spindles in their travel through the tunnel and until they leave the plants are continuously rotated for a purpose which will be apparent. The means and manner of and for causing this rotation will be presently described.

Endless chains 55 and 56 are located at the bottom of the supplemental frame or picking unit arranged to converge from points adjacent the end of the mouth or opening 50 to points on either side of the shield 51 where the same contacts with the picking spindle, these chains being rotatably trained about suitable sprockets. The chain 55 is trained about the sprockets 57, 58, 59 and 60 and chain 56 about sprockets 61, 62 and 63 said latter chain also passing around the idler 64.

The sprockets 59 and 62 are respectively secured to shafts 65 and 66 suitably journaled to the supplemental frame, the bearings of the shaft being shown at 67 and 68. The mouth 50 of the tunnel is defined by a suitable frame 69 which slopes forwardly down from the top to the bottom of the supplemental frame. The purpose of these endless chains is to guide the cotton stalks rearwardly into the tunnel and to prevent the same from being broken or otherwise mangled by the passing of the machine along the rows and to present the stalks in proper position for the picking spindles to effectively operate thereupon.

As the roller chains 19 are rotated, the toothed wheels 24 of the various spindles are brought successively into cooperation with racks 70 arranged on the wall 71 connecting the tracks 26. This wall 71 extends entirely around the path travelled by the spindle carrying means and forms an inner shell or backing for the inner ends of the spindles and the toothed wheels carried thereby, as shown in Figure 4. This wall prevents the spindles from moving inwardly through the holes in the slats.

Wall 71 which carries the racks 70 is deflected or curved outwardly approximately on the arc of a circle. The structure comprising the wall 71 and the racks being rigid, and therefore not displaceable laterally, the series of spindles will have a well defined position and cannot move inwardly to varying degrees, as would be the case if a non-rigid structure were under consideration. Cotton wound on the spindles is not accidentally loosened at or near the ends of the spindles.

The racks are provided with apertures 72 which receive the teeth 73 of the wheels 24 whereby as the roller chains revolve the spindles are caused to rotate in one direction.

Horizontally extending web elements 75 are positioned in parallel relation with reference to the rows. These elements lie in the same horizontal planes as the guard bars 74.

As has been stated above, there are a number of these spindles to each slat arranged one above the other and in the present arrangement there are some 1700 spindles in a picking unit although it will be readily understood that this number may be varied as may be found desirable or convenient. With so large a number of spindles, it will readily be seen that few if any of the cotton bolls will escape contact with one of them in the passing of the spindles through the foliage of the plants.

The previously moistened spindles being given a rotary movement as they pass through the cotton stalks will effect the adherence of the fiber thereto and will wind it completely thereupon, the spindles having been previously moistened as indicated above and by a device which will presently be described.

The cotton is now securely wound about the spindles and the problem is to disengage it therefrom. As the spindles pass around the other side of the machine which may be referred to for convenience as the delivery side as opposed to the picking side, the projecting ends of the spindles pass into a compartment designated as a whole at 76, where the spindles of each level pass through a plurality of compartments defined by the side walls 77 of the supplemental frame and walls 78 extending horizontally therefrom. The ends of the walls 78 toward the track for the roller chains 19 are provided with flanges 79. The compartments defined by these walls are progressively narrower toward the forward end of the machine and the flanges 79 thereof serve to guide travelling steel ribbons 80 which are designed to contact snugly with the spindles both from below and above as shown in Figure 4 of the drawings.

As the spindles and the ribbons travel through these compartments, it will be seen that the tendency of the coaction therebetween will be to strip the cotton from the spindles and in order to facilitate this there is provided adjacent the entrance of these compartments a plurality of racks 81 reversely disposed from the position of the racks 70 previously described and adapted for this reason to rotate the spindles in a direction opposite from that which the spindles were first rotated in winding cotton on the spindles. This rotation in an opposite direction will tend to unwind the cotton to a certain degree leaving it loose on the spindles and in a condition that it may readily be stripped therefrom by the action of the steel ribbons 80 as above described.

The location of these racks 81 is at a point designated by the numeral 82 on Figure 1 of the drawings and the racks are about six inches in length or a length to cause about four revolutions of each spindle. The ribbons 80 travel around both sides of the picking device and rest on the picking side against the slats until the turn at the rear end of the machine has been completely made. The travel is then diagonally outward in conformity with the compartment as above described, this travel being insured by a roller on the shaft 83, the upper end of which is provided with sprocket wheel 84. After passing around the roller on the shaft 83, the ribbons pass around an idler 85 and thence into contact with the slats between the horizontal rows of spindles.

At the forward end thereof, the compartments defined by the walls 77 and 78 and flanges 79 are connected with a suction device designated at 86 by which the cotton is drawn from the compartments and blown through a pipe 87 into a receiver 88 in the nature of a sack or bag which is arranged transversely of the machine resting upon the frame thereof. This sack when filled may be removed from the end of the pipe 87 and another bag substituted therefor.

In their travel in the path as described above, the spindles pass between moistening units 89 which may be in the nature of sponges or layers of felt arranged in spaced relation to each other, the spaces being in the horizontal planes of travel of the spindles. Each layer may be provided with a tube 90 extending horizontally therethrough and provided with a plurality of apertures 91 to allow the escape of fluid into the layers of felt or sponge, the inner ends of the tube 90 are closed and the opposite ends are connected with a main supply pipe 92 which in turn is fed through a flexible tube 93 leading from the tank 94 mounted on the main frame. The flexible tube may be in the nature of a rubber hose and is provided in order to permit of the vertical adjustment of the supplemental frame the tank being mounted on the main frame of the truck.

As previously stated, the endless belt comprising the roller chains and slats with the spindles mounted thereon is revolved through a connection with the bull wheel 11 through the sprocket chain 49, the shaft 27 and the rear shaft 22. The forward sprocket wheel 21 on the forward shaft 22 affords a drive for the mechanism of the fan of the suction device 86 through the shaft 95 extending vertically of the supplemental frame and suitably journaled thereto, the upper end of said shaft 95 being provided with a sprocket wheel 96 about which is trained a sprocket chain 97, this sprocket chain being also trained about the sprocket 21 of the forward shaft 22 and about the sprocket 84 of shaft 83 extending from thence around sprocket 59*a* on shaft 65 then surrounding the idler 98 and then surrounding sprocket 62*a* on shaft 66 around the sprocket 21 and the idler 99.

It will thus be seen that the sprocket chain 97 drives the fan mechanism 86, the steel ribbons 80, the sprocket chains 55 and 56, the movement of the chains 55 and 56 being rearwardly on the adjacent reaches and at a speed substantially the same as a forward movement of the truck. Similarly the ribbons 80 are revolved at about this same speed.

It will be observed also that as the machine moves forward that the sprocket chain 49 will revolve in an anti-clockwise direction and through shafts 27 and 22 the endless belt comprising the roller chains 19 and spindle carrying slats 20 together with the ribbons 80 will be revolved in an anti-clockwise direction, whereby the spindles effective for picking will be moving rearwardly with respect to the machine as the machine moves forward and the drive chain 97 is so trained about sprockets 84, 59*a* and 62*a* that the ribbons 80 will be revolved anti-clockwise and the chains 55 will be revolved in an anti-clockwise and chain 56 will be revolved in a clockwise direction. By this arrangement, it will be seen that the converging adjacent reaches of these chains will move rearwardly together at the same rate of travel effectively guiding the stalks of cotton rearwardly in the tunnel.

The reference numeral 101 designates the cotton rows and the plants are designated by the numeral 102. The rows and plants are shown and described to clearly bring out the arrangement of the machine with respect thereto when in operation, and it will be noted that the spindles pick laterally of the plants and work from one side of the rows, with the result a machine of this character will contain few parts and will therefore be inexpensive to manufacture yet will completely strip the plants of ripe cotton.

A radius rod or arm 103 has one end pivotally connected with the shaft of the bull wheel and its opposite end is substantially hingedly secured to the supplemental frame as at 104. The arm 103 braces the said frame and holds the same in substantially parallel relation with respect to the shaft of the bull wheel and makes it unnecessary to remove the chain 49 when the supplemental frame is raised. Briefly to capitulate with regard to the operation which, it is believed, however, will be clearly understood from the the foregoing description, as the machine is passed along the rows of cotton, the tongue 15 will be kept over the row to be picked with the bull wheel riding in the trench on one side thereof and the small wheel 12 in a trench spaced therefrom. The cotton stalks of this row will pass into the mouth 50 of the tunnel and will be guided rearwardly by the chains 55 and 56 into the tunnel as described above where the steel plate 51 will press the stalks between the spindles 23 which have been previously moistened by passing between the moistening devices 89. The racks 70 will cause the spindles to rotate and due to the moisture on the spindles, the fiber in the cotton bolls will adhere thereto and will be wound about the spindles.

By employing the great number of spindles arranged as shown and described, as many as four spindles may operate upon a single boll, so that all of the cotton will be completely removed from the cotton pod.

The spindles in their travel are so timed that they will pass rearwardly at the same rate that the machine passes forwardly and this timed relation also applies to the chains 56 and 57. By this arrangement, it will be understood that no material damage to the stalks will occur.

As the machine passes forward and when the spindles have finished their work, the spindles will pass out of the stalk carrying the fiber therewith and will pass around the shaft 22 into the delivery compartment. At the beginning of this compartment, the spindles will be given rotation in the opposite direction by means of the racks 81 loosening the cotton upon the spindles and the ribbons 80 travelling with the spindles and passing diagonally through the compartments defined by the walls 77, 78 and 79 will gradually strip the fiber from the spindles delivering the same at the forward end of the compartments to the end of the suction device 86 which will suck the fiber from the compartments and blow it into a receiver 88. Rotation of the blower or suction device is effected through the sprocket chain 97 as above described.

When it is desired to move the machine from one location to another for operation, the supplemental frame or picking unit may be raised by means of the lever 45 out of its operative position, so as to be out of danger of being damaged by contacting obstructions and the like.

The spindles 23 are made from the best grade of steel spring wire and preferably from number 9 or 10 wire. However, the size may be varied as found convenient or desirable.

The single row machine described herein is designed to be propelled by draft animals. The picking units may, however, be manufactured in pairs, to be mounted upon and powered by suitable tractors thus providing self-propelled two-row pickers.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A cotton picking machine having a picking side and a stripping side, and comprising a longitudinally movable endless member having surface portions facing laterally, a track for said member, arranged longitudinally of the machine, means for imparting movement to the member, a plurality of rows of spindles carried by the endless member, said track being outwardly bowed at the picking side of the machine and substantially flat at the stripping side thereof, spaced longitudinally extending bars at the picking side between which the spindles pass, a shield carried by the picking side of the machine and forming with the bars a longitudinally extending passage for receiving the plants as the machine travels along, an intermediate portion of the shield being bowed outwardly to conform to the bowed part of the track, means for rotating the spindles as they pass through the passage, means for rotating the spindles in an opposite direction at the stripping side of the machine and stripping means at the stripping side of the machine.

2. A cotton picking machine having picking and stripping sides, comprising a vertically adjustable frame, upper and lower tracks thereon, said tracks being of elongated form and extending longitudinally of the frame, endless members travelling over said tracks, vertically arranged slats connected at their ends to the endless members, a plurality of spindles passing through the slats, a wall forming member connected with the tracks and around which the slats travel, racks carried by those parts of the wall forming member which are located on the picking side of the machine and on certain parts of said member which are on the stripping side, toothed wheels on the inner ends of the spindles engaging the racks during the travel of the spindle carrying means, means for imparting movement to the endless members and stripping means engaging the spindles on the stripping side of the machine.

3. In a cotton picking machine, an endless travelling member movable in a predetermined path longitudinally of the machine, means for imparting movement to the endless member, a plurality of rows of spindles carried by said endless member, means including a fixed vertical wall extending on a given side of the machine, and devices carried by this wall and extending longitudinally thereof and in contact with the spindles for uniformly limiting inward movement to a predetermined extent and producing rotation of the spindles incident to the longitudinal movement of the travelling member.

4. In a cotton picking machine, a frame having its main axis extending longitudinally of the machine, and having rigid spaced side walls extending vertically, spindle controlling means on the side walls, said frame also having curved vertical end portions connecting the side walls, one side wall being curved so that any segment thereof corresponds substantially with other segmental portions of this wall, a plurality of spindles, and means for mounting the spindles for movement around said ends and along said side walls.

5. In a cotton picking machine, a plurality of spindles, a frame including a longitudinally extending spindle-retaining structure including longitudinal members for engaging said spindles, said structure also presenting spaced side walls fixed as to position, one of the side walls including a portion curved so that any segment thereof corresponds substantially with other segments of this wall, and means for mounting said spindles for movement along said members in rotating engagement therewith.

6. In a cotton picking machine, a frame, a longitudinally extending element carried thereby and presenting a plurality of spaced vertical side walls, having fixed position one wall being deflected outwardly from the longitudinal axis of said element in an elongated arc-like curve, the end portions of the side walls approaching each other, a plurality of spindles, and travelling means for mounting the spindles, one side wall including means engaging said spindles and determining the relative angular position of the spindles at different stages of their movement along paths defined by the mounting means.

7. In a cotton picking machine, a plurality of spindles, travelling means for mounting the spindles in longitudinally extending rows, horizontally extending web elements positioned in parallel relation with reference to the rows, and a unitary element including means for rotating the spindles incident to the movement of the travelling means, said unitary element including an outwardly curved side and a flat side, the sides of the unitary element each constituting a structure including spindle engaging means determining the paths of travel of the spindles.

8. In stripping mechanism for the spindles of cotton picking machines, the combination with a plurality of spindles positioned in rows, means for mounting the spindles for movement in paths extending longitudinally of the machine, a pair of travelling ribbons associated with each row of spindles and between which the spindles extend, each ribbon having one free edge, and the ribbons being responsive individually to the movement of the spindles of a single row, and guiding means for causing the ribbons to move in a direction transversely of their length, toward the outer ends of the spindles, for stripping the cotton from said spindles.

9. A cotton picking machine having a picking side and stripping side, comprising an endless travelling member, tracks for said member arranged longitudinally of the machine, means for imparting movement to said endless member, a plurality of rows of spindles carried by said endless member, said tracks being outwardly bowed at the picking side of the machine and substantially flat at the stripping side thereof, spaced longitudinally extending guide elements at the picking side between which the spindles pass, a shield carried by the picking side of the machine and forming with the guide elements a longitudinally extending passage for receiving the plants as the machine travels along, means for rotating the spindles as they pass through the passage and stripping means at the stripping side of the machine.

10. A cotton picking machine having a picking side and a stripping side, an endless travelling member, tracks for said member arranged longitudinally of the machine, means for imparting movement to said endless travelling member, a plurality of rows of spindles carried by said endless travelling member, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, and stripping means at the stripping side of the machine.

11. A cotton picking machine having a picking side and a stripping side, an endless travelling member, tracks for said member arranged longitudinally of the machine, means for imparting movement to said endless travelling member, a plurality of rows of spindles carried by said endless travelling member, said tracks being outwardly bowed at the picking side of the machine and substantially flat at the stripping side thereof, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, and stripping means at the stripping side of the machine.

12. A cotton picking machine having a picking side and a stripping side, an endless travelling member, tracks for said member arranged longitudinally of the machine, means for imparting movement to said endless travelling member, a plurality of rows of spindles carried by said endless travelling member, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, stripping means at the stripping side of the machine, and means at the entrant end of said passage for guiding the stalks of the plants into the passage for purposes described.

13. A cotton picking machine having a picking side and a stripping side, an endless travelling member, tracks for said member arranged longitudinally of the machine, means for imparting movement to said endless travelling member, a plurality of rows of spindles carried by said endless travelling member, said tracks being outwardly bowed at the picking side of the machine and substantially flat at the stripping side thereof, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, stripping means at the stripping side of the machine, and means at the entrant end of said passage for guiding the stalks of the plants into the passage for purposes described.

14. A cotton picking machine having a picking side and a stripping side, an endless travelling member, tracks for said member arranged longitudinally of the machine, means for imparting movement to said endless travelling member, a plurality of rows of spindles carried by said endless travelling member, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, stripping means at the stripping side of the machine, and means at the entrant end of said passage for guiding the stalks of the plants into the passage for purposes described, said last-named means comprising endless chains arranged to converge from the front end of the machine toward the place where the spindles enter the passage.

15. A cotton picking machine having a picking side and a stripping side, an endless travelling member, tracks for said member arranged longitudinally of the machine, means for imparting movement to said endless travelling member, a plurality of rows of spindles carried by said endless travelling member, said tracks being outwardly bowed at the picking side of the machine and substantially flat at the stripping side thereof, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, stripping means at the stripping side of the machine, and means at the entrant end of said passage for guiding the stalks of the plants into the passage for purposes described, said last-named means comprising endless chains arranged to converge from the front end of the machine toward the place where the spindles enter the passage.

16. A cotton picking machine having a picking side and a stripping side, an endless travelling member, tracks for said member arranged longitudinally of the machine, means for imparting movement to said endless travelling member, a plurality of rows of spindles carried by said endless travelling member, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, stripping means at the stripping side of the machine, and means at the entrant end of said passage for guiding the stalks of the plants into the passage for purposes described, said last-named means comprising endless chains arranged to converge from the front end of the machine toward the place where the spindles enter the passage, the passage being restricted at the place where the chains come closest together.

17. A cotton picking machine having a picking side and a stripping side, an endless travelling member, tracks for said member arranged longitudinally of the machine, means for imparting movement to said endless travelling member, a plurality of rows of spindles carried by said endless travelling member, said tracks being outwardly bowed at the picking side of the machine and substantially flat at the stripping side thereof, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, stripping means at the stripping side of the machine, and means at the entrant end of said passage for guiding the stalks of the plants into the passage for purposes described, said last-named means comprising endless chains arranged to converge from the front end of the machine toward the place where the spindles enter the passage, the passage being restricted at the place where the chains come closest together.

18. A cotton picking machine having a picking side and a stripping side, an endless travelling member, tracks for said member arranged longitudinally of the machine, means for imparting movement to said endless travelling member, a plurality of rows of spindles carried by said endless travelling member, said tracks being outwardly bowed at the picking side of the machine and substantially flat at the stripping side thereof, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, stripping means at the stripping side of the machine, and means at the entrant end of said passage for guiding the stalks of the plants into the passage for purposes described, said means comprising members at each side of the passage which converge from the entrance of the passage to a place where the plants are engaged by the spindles.

19. A cotton picking machine having a picking side and a stripping side, an endless travelling member, tracks for said member arranged longitudinally of the machine, means for imparting movement to said endless travelling member, a plurality of rows of spindles carried by said endless travelling member, said tracks being outwardly bowed at the picking side of the machine and substantially flat at the stripping side thereof, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, stripping means at the stripping side of the machine, and means at the entrant end of said passage for guiding the stalks of the plants into the passage for purposes described, said means comprising members at each side of the passage which converge from the entrance of the passage to a place where the plants are engaged by the spindles, the passage at such place being restricted.

20. A cotton picking machine having a picking side and a stripping side, an endless travelling member, tracks for said member arranged longitudinally of the machine, means for imparting movement to said endless travelling member, a plurality of rows of spindles carried by said endless travelling member, said tracks being outwardly bowed at the picking side of the machine and substantially flat at the stripping side thereof, the machine at the picking side having a longitudinally extending passage for receiving the plants and through which the plants pass and into which the spindles are projected as the machine travels along, means for rotating the spindles as they pass through the passage, means to restrain the plants against following the spindles as they leave the passage, stripping means at the stripping side of the machine, and means at the entrant end of said passage for guiding the stalks of the plants into the passage for purposes described, said means comprising members at each side of the passage which converge from the entrance of the passage to a place where the plants are engaged by the spindles, the outer wall of the passage from said place to a place where the spindles leave the passage being outwardly bowed to conform to the bowing of said track.

21. In a cotton picking machine having a picking side and a stripping side, longitudinally arranged tracks, an endless travelling member passing along said tracks and including vertically disposed slats having horizontal apertures, and spindles journaled in said apertures and having enlargements at one end, the spindles being insertable through said apertures with said enlargements serving as stops in one direction, an endless wall adjacent said enlargements serving as a stop in the opposite direction for retaining said spindles against withdrawal from said slats.

22. In a cotton picking machine having a picking side and a stripping side, longitudinally arranged tracks, an endless travelling member passing along said tracks and including vertically disposed slats having horizontal apertures, spindles journaled in said apertures and having enlargements at one end, the spindles being insertable through said apertures with said enlargements serving as stops in one direction, an endless wall adjacent said enlargements serving as a stop in the opposite direction for retaining said spindles against withdrawal from said slats, and means carried by said wall for engaging said enlargements to rotate the spindles.

23. In a stripping mechanism for spindles of cotton picking machines which have a picking side and a stripping side, the combination with a plurality of spindles positioned in rows, means for mounting the spindles for movement in paths extending longitudinally of the machine, a pair of stripping ribbons associated with each row of spindles and between which the spindles extend at the stripping side of the machine, means for supporting said ribbons throughout the stripping side of the machine and holding the ribbons to diverge from that place where the spindles arrive at the stripping side in order to cause relative movement of the ribbons from the butt ends of the spindles to the point ends thereof as the spindles travel along the stripping side of the machine.

24. In a cotton picking machine a tunnel through which the plants are passed, said tunnel having a straight side and a side with an outwardly flared entrance and a restricted throat and an arcuate portion located to the rear of the throat in which portion a picking means operates.

25. In a cotton picking machine a tunnel through which the plants are passed, said tunnel having a straight side and a side with an outwardly flared entrance, a restricted throat and an arcuate portion located to the rear of the throat in which portion a picking means operates, and moving chains located in the entrance to the tunnel and converging rearwardly into the throat for the purposes described.

26. A cotton picking machine having a picking side and a stripping side, an endless traveling member, tracks for said member arranged longitudinally of the machine, means for imparting movement to said endless traveling member, a plurality of rows of spindles carried by said endless traveling member, said tracks being outwardly bowed at the picking side of the machine, the picking side having a longitudinally extending passage for receiving the plants and through which the plants pass and into which the spindles are projected as the machine travels along, means for rotating the spindles as they pass through the passage, means to restrain the plants against following the spindles as they leave the passage, and means for stripping the cotton from the spindles.

27. A cotton picking machine having a picking side and a stripping side, an endless traveling member, tracks for said member arranged longitudinally of the machine, means for imparting movement to said endless traveling member, a plurality of smooth surfaced spindles carried by said endless traveling member, said tracks being outwardly bowed at the picking side of the machine, the picking side having a longitudinally extending passage for receiving the plants and through which the plants pass and into which the spindles are projected as the machine travels along, means for rotating the spindles as they pass through the passage, means to restrain the plants against following the spindles as they leave the passage, and means for stripping the cotton from the spindles.

28. A cotton picking machine having a picking side and a stripping side, an endless traveling member, tracks for said member arranged longitudinally of the machine, means for imparting movement to said endless traveling member, a plurality of non-tapered smooth surfaced spindles carried by said endless traveling member, said tracks being outwardly bowed at the picking side of the machine, the picking side having a longitudinally extending passage for receiving the plants and through which the plants pass and into which the spindles are projected as the machine travels along, means for rotating the spindles as they pass through the passage, means to restrain the plants against following the spindles as they leave the passage, and means for stripping the cotton from the spindles.

29. A cotton picking machine having a picking side and a stripping side, an endless traveling member, tracks for said member arranged longitudinally of the machine, means for imparting movement to said endless traveling member, a plurality of rows of spindles carried by said endless traveling member, said tracks being outwardly bowed at the picking side of the machine, the picking side having a longitudinally extending passage for receiving the plants and through which the plants pass and into which the spindles are projected as the machine travels along, means for rotating the spindles as they pass through the passage, means to restrain the plants against following the spindles as they leave the passage, stripping means at the stripping side of the machine, and means at the entrant end of said passage for guiding the stalks of the plants into the passage for purposes described, said means comprising members at each side of the passage which converge from the entrance of the passage to a place where the plants are engaged by the spindles, the passage at such place being restricted.

30. In a cotton picking machine, an endless traveling member, a plurality of picking spindles journaled in apertures of said traveling member, said spindles having enlargements at one end, the spindles being insertable into said apertures with said enlargements serving as stops in one direction, and inner stationary retaining means adjacent said enlargements serving as stops in the opposite direction and preventing undue inward movement of said spindles.

31. In a cotton picking machine, longitudinally arranged tracks, an endless traveling member passing around said tracks, said traveling member including slats having apertures and spindles journaled therein, said spindles having enlargements at one end, the spindles being insertable into said apertures with said enlargements serving as stops in one direction, and inner stationary retaining means adjacent said enlargements serving as stops in the opposite direction and preventing undue inward movement of said spindles.

32. In a cotton picking machine, longitudinally arranged tracks, an endless traveling member passing around said tracks, said traveling member including vertically disposed slats having horizontal apertures and spindles journaled therein, said spindles having enlargements at one end, the spindles being insertable into said apertures with said enlargements serving as stops in one direction, and inner stationary spindles retaining means adjacent said enlargements serving as stops in the opposite direction and preventing undue inward movement of said spindles.

33. In a cotton picking machine, an endless traveling member, a plurality of picking spindles journaled in apertures of said traveling member, said spindles having enlargements at one end, the spindles being insertable into said apertures with said enlargements serving as stops in one direction, and inner retaining means adjacent said enlargements serving as stops in the opposite direction and preventing undue inward movement of said spindles.

34. In a cotton picking machine, longitudinally arranged tracks, an endless traveling member passing around said tracks, said traveling member including slats having apertures and spindles journaled therein, said spindles having enlargements at one end, the spindles being insertable into said apertures with said enlargements serving as stops in one direction, and inner retaining means adjacent said enlargements serving as stops in the opposite direction and preventing undue inward movement of said spindles.

35. In a cotton picking machine, longitudinally arranged tracks, an endless traveling member passing around said tracks, said traveling member including vertically disposed slats having horizontal apertures and spindles journaled therein, said spindles having enlargements at one end, the spindles being insertable into said apertures with said enlargements serving as stops in one direction, and inner retaining means adjacent said enlargements serving as stops in the opposite direction and preventing undue inward movement of said spindles.

36. In a cotton picker, an endless traveling member including slats, tracks for said endless traveling member arranged longitudinally of the machine, means for imparting movement to said endless member, smooth surfaced spindles journaled in the slats, means for rotating the spindles, means for applying liquid to the spindles, means for stripping cotton from said spindles, and means for conveying cotton from said stripping means to a suitable receptacle.

37. In a cotton picker, an endless traveling member, a plurality of round smooth non-tapered spring steel spindles carried by said traveling member, means for rotating said spindles, means for applying liquid to the spindles, and means for stripping cotton from the spindles.

JOHN DANIEL RUST.